(12) United States Patent
Dent

(10) Patent No.: US 7,864,663 B2
(45) Date of Patent: Jan. 4, 2011

(54) ORTHOGONAL SPREAD-SPECTRUM WAVEFORM GENERATION WITH NON-CONTIGUOUS SPECTRAL OCCUPANCY FOR USE IN CDMA COMMUNICATIONS

(75) Inventor: Paul W. Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 316 days.

(21) Appl. No.: 11/929,268

(22) Filed: Oct. 30, 2007

(65) Prior Publication Data

US 2008/0291821 A1 Nov. 27, 2008

Related U.S. Application Data

(60) Provisional application No. 60/940,129, filed on May 25, 2007.

(51) Int. Cl.
*H04J 11/00* (2006.01)

(52) U.S. Cl. .................. 370/210; 370/302; 370/342; 375/130; 375/302

(58) Field of Classification Search .......... 370/203, 370/208, 342; 375/130, 302
See application file for complete search history.

(56) References Cited

U.S. PATENT DOCUMENTS

| | | | | |
|---|---|---|---|---|
| 5,568,509 A | * | 10/1996 | Hershey et al. | ............. 375/130 |
| 5,572,552 A | | 11/1996 | Dent et al. | |
| 6,009,089 A | * | 12/1999 | Huang et al. | ................. 370/342 |
| 6,128,276 A | * | 10/2000 | Agee | ........................... 370/208 |
| 6,278,686 B1 | | 8/2001 | Alard | |
| 6,963,532 B1 | | 11/2005 | Dent | |
| 2005/0207333 A1 | * | 9/2005 | Rotstein et al. | ............. 370/203 |
| 2005/0220219 A1 | * | 10/2005 | Jensen | ........................ 375/302 |

OTHER PUBLICATIONS

Leon W. Couch II, Digital and Analog Communications Systems 1993, Macmillan Publishing Company, Fourth Edition, pp. 49-51.*
U.S. Appl. No. 11/631,789, filed Jan. 8, 2007, Dent.
U.S. Appl. No. 11/631,790, filed Jan. 8, 2007, Dent.

* cited by examiner

*Primary Examiner*—Huy D Vu
*Assistant Examiner*—Joey Bednash
(74) *Attorney, Agent, or Firm*—Nixon & Vanderhye P.C.

(57) ABSTRACT

The technology in this application spreads a signal over an available discontinuous spectrum, such as a radio frequency band, so that the spread signal only occupies the non-contiguous spectrum. In this way, CDMA transmission and reception can be used in a fragmented or non-contiguous spectrum that otherwise would not be useable for direct sequence spreading. Spreading over non-contiguous portions of spectrum is preferably performed without producing unacceptable interference in portions of unavailable spectrum located between the allowed spectrum. By avoiding unacceptable interference in portions of unavailable spectrum located between the allowed spectrum, the unavailable spectrum may be used by other users or services.

11 Claims, 7 Drawing Sheets

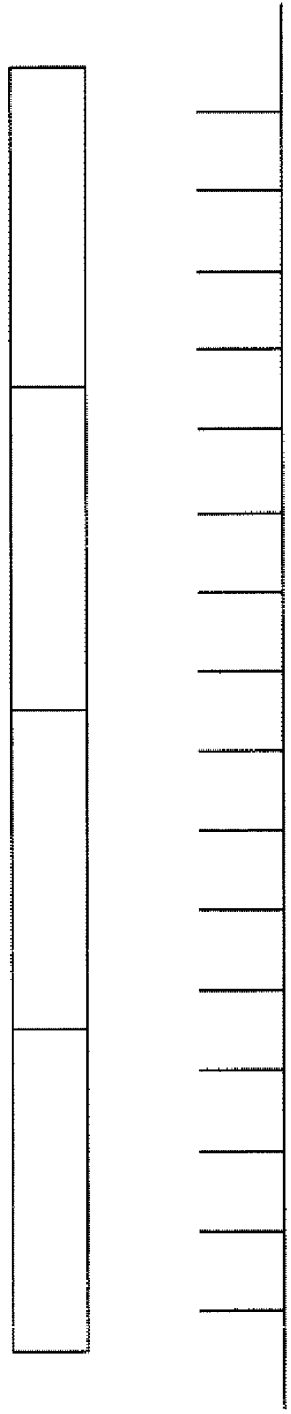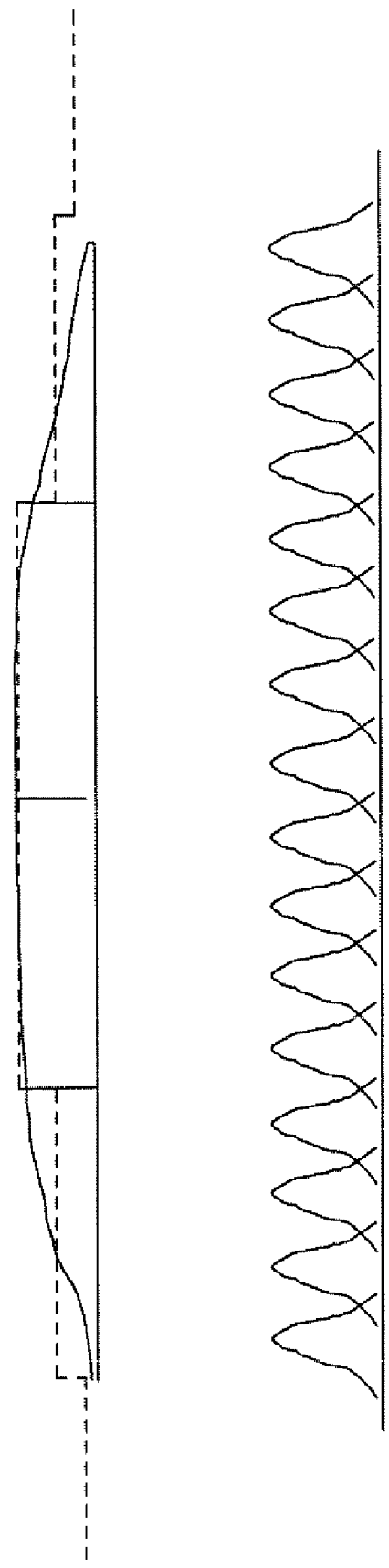
Fig. 3A
Fig. 3B

US 7,864,663 B2

ORTHOGONAL SPREAD-SPECTRUM WAVEFORM GENERATION WITH NON-CONTIGUOUS SPECTRAL OCCUPANCY FOR USE IN CDMA COMMUNICATIONS

PROVISIONAL PRIORITY APPLICATION

Priority is claimed from U.S. provisional application Ser. No. 60/940,129, filed on May 25, 2007, the contents of which are incorporated herein by reference.

TECHNICAL FIELD

The technical field is communications. The technology described below is related to Code Division Multiple Access (CDMA). Non-limiting example applications include multiple-access communications systems such as cellular and satellite communication systems.

BACKGROUND

Direct sequence spread spectrum used in CDMA systems generates a pseudorandom code and multiplicatively modulates a narrowband, data-modulated signal with the pseudorandom code to spread it over the radio frequency (RF) spectrum. Other signals spread with different, preferably orthogonal, codes may overlap in frequency and time and yet may be distinguished at a receiver designed to demodulate or despread a particular signal using its particular pseudorandom code. The frequency spectrum occupied by the spread spectrum signal is contiguous meaning that the transmitted signal occupies a particular frequency band of the spectrum continuously across that frequency band; there are no portions of the spectrum in that frequency band that are not substantially occupied by the spread signal. That continuous occupation across the spectrum is an unavoidable property of a pseudorandom code because the spectrum is the Fourier transform of the pseudorandom code's autocorrelation function. By definition, pseudorandom code has an Dirac or unit impulse response function autocorrelation, so its Fourier transform is flat and continuous in the frequency domain.

Frequency hopping (FH) spread spectrum uses non-contiguous spectrum with all of the signal energy appearing instantaneously in one FH channel. But that channel moves rapidly from instant-to-instant or hop-to-hop. The time during which the energy appears in any one FH channel is called the "dwell time". The interference characteristics of frequency hopping systems to themselves and to or from other systems is therefore quite different than Direct Sequence (DS) CDMA systems. Frequency hopping transmissions tend to create, and be tolerant of, high levels of momentary, narrowband interference with a low probability of incidence. Direct sequence transmissions create, and are tolerant of, low levels of continuous, wideband interference. In scenarios where there are large distance variations between wanted and unwanted transmitters and receivers, called the "high near/far ratio" scenario, frequency hopping generally provides superior performance. In a scenario where wanted and unwanted radios are at equal distance from each other, such as satellite systems that have dedicated spectrum not shared with other terrestrial services, direct sequence may provide better performance. Direct sequence spread spectrum (DSSS) is also used in many modem wireless communications systems, like cellular systems, where near/far ratios may be managed by commanding a mobile terminal to communicate via the nearest base station.

Until now, it has only been possible to use direct sequence spread spectrum with a contiguous spectrum. For example, direct sequence could not be used by licensees who, for historical or other reasons, found themselves with a fragmented or non-contiguous spectrum. Non-contiguous means that the transmitted signal simultaneously occupies multiple portions of the spectrum across a particular frequency band so that there are portions of the spectrum in that band that are not occupied by the spread signal.

Another problem concerns multi-path propagation. When signal echoes are received via delayed paths, and the echo path delay is more than a small fraction of the duration of a modulation symbol, multi-path distortion is produced in which successive symbols appear to be mixed. This multi-path distortion effect is also known as Intersymbol Interference (ISI). Signals suffering from ISI may be decoded using one of the various types of equalizers, such as the Viterbi Maximum Likelihood Sequence Estimation algorithm, a transversal equalizer, a decision feedback equalizer, or hybrids thereof. A RAKE receiver for direct sequence spread spectrum signals performs a similar function but in a different way.

Other solutions to multi-path distortion include splitting a data stream into multiple, slower speed data streams, the symbol duration of each now being much longer than the multi-path echo delay, and transmitting the streams in parallel over separate channels. The separate channels are contiguous, narrowband channels within an allocated bandwidth, and this type of transmission was variously known as "multi-tone modem modulation," "Kineplex," and when the channel spacing of the narrowband channels bears a particular relationship to the data rate on each channel, Orthogonal Frequency Division Multiplexing (OFDM) of the separate channels. OFDM is not spread spectrum because the total bandwidth occupied is commensurate with the total underlying data rate. Two OFDM signals should not overlap as they do not have a distinguishing spread-spectrum code that would allow a receiver to separately distinguish them.

In any event, it would be desirable to use Spread Spectrum Code Division Multiple Access systems in non-contiguous spectrum and to be able to reduce or minimize adverse multi-path effects on such non-contiguous spectrum communications.

SUMMARY

The technology in this application solves these problems (and others) and meets the desirable goals identified above (and others). The technology spreads a signal over an available discontinuous spectrum, such as a radio frequency band, so that the spread signal substantially only occupies the non-contiguous spectrum. As a result, the signal energy in unavailable spectrum portions is generally below a predetermined maximum, which in some cases might be a very low maximum. In this way, CDMA transmission and reception can be used in a fragmented or non-contiguous spectrum that otherwise would not be useable for direct sequence spreading. In the domain of electromagnetic radiation, a spectrum is a series of radiant energies arranged in order of wavelength or of frequency. Although the technology applies to any type of spectrum, for purposes of illustration and not limitation, a frequency spectrum is used in the example embodiments below.

Spreading over non-contiguous portions of spectrum is preferably performed without producing unacceptable interference in portions of unavailable spectrum located between the allowed spectrum. By avoiding unacceptable interference in portions of unavailable spectrum located between the allowed spectrum, the unavailable spectrum may be used by other users or services. Even though multiple instances of such signals spread over the non-contiguous spectrum may overlap, they can be distinguished using different spread-spectrum codes. In contrast with OFDM, which must perform a fast Fourier transform (FFT) for each new block of data symbols, the non-contiguous spectrum spreading waveform obtained by performing just one Fourier transform on a spreading codeword corresponding to a spread data symbol may be repeated over and over again, each time being modulated with different, successive, underlying data symbols. The inverse Fourier transform of the non-contiguous spectrum therefore only needs to be performed once at the transmitter and the resulting non-contiguous spectrum spreading waveform stored.

In one example embodiment, a predetermined, non-contiguous spectrum is generated having non-zero components in permitted or available regions of the electromagnetic spectrum and zero components in non-permitted or non-available regions of the electromagnetic spectrum. A non-contiguous spectrum spreading signal associated with the non-contiguous spectrum is produced. In a preferred but example implementation, samples of the shaped non-contiguous spectrum spreading signal may be stored in memory for repeated use. The information is processed into a stream of data symbols. The non-contiguous spectrum spreading signal and a data symbol from the stream are combined to produce a data modulated signal. The data modulated signal is then modulated onto a carrier signal having a desired center frequency to produce a signal for transmission and transmitted. Data modulated signals produced by successive data symbols from the stream may be overlapped to produce a transmission signal.

In one example implementation, producing the non-contiguous spectrum spreading signal includes performing an inverse Discrete Fourier Transformation on the non-contiguous spectrum to produce a sequence of time waveform samples. Combining the non-contiguous spectrum spreading signal and a data symbol from the stream to produce a data modulated signal includes multiplying the data symbol value with each sample of the sequence of time waveform samples. A block of signal samples corresponding to the non-contiguous spectrum spreading signal is preferably repeated. Successive samples from the repeated blocks are weighted using a shaping function to produce a shaped, non-contiguous spectrum spreading signal used in the combining. Samples of the resulting shaped non-contiguous spectrum spreading signal are stored in memory.

In another example implementation, producing the non-contiguous spectrum spreading signal includes allocating a complex number to represent the amplitude and phase of each non-zero component of the non-contiguous spectrum and a zero value to represent the zero spectral components. Combining the non-contiguous spectrum spreading signal and a data symbol from the stream to produce a data modulated signal includes multiplying the data symbol value with each complex number to generate a set of products and performing an inverse Discrete Fourier Transform on the set of products to produce the data modulated signal. A block of signal samples corresponding to the data modulated signal is preferably repeated. Successive samples from the repeated blocks are weighted using a shaping function to produce a shaped, data modulated signal. Shaped data modulated signals produced by successive data symbols from the stream are overlapped to produce a transmission signal.

In another example implementation, a sequence or code from a set of orthogonal codes is selected and used to generate the non-contiguous spectrum and to determine a phase of successive non-zero spectral components. A first data modulated signal is produced using a first code from the set of orthogonal codes. At least a second data modulated signal is produced using a second code from the set of orthogonal codes. The first and second data modulated signals are combined to produce a composite modulating signal, which is used in modulating the data modulated signal on to the carrier signal.

At the receiver, a signal waveform in the time domain including a non-contiguous spectrum signal is received. One or more components of the time domain signal waveform is transformed to produce contiguous spectral components. From the contiguous spectral components, those components that correspond to the predetermined, non-contiguous regions of the spectrum are selected to obtain non-contiguous spectral components. The non-contiguous spectral components are processed to produce one or more received symbol values. The symbol values are then decoded to reproduce the information.

In one example implementation, the received signal includes repeated, shaped signal blocks modulated with a data symbol. Each signal block may be weighted with a corresponding shaping function. Corresponding samples of the weighted blocks are added to generate a matched filtered block corresponding to the non-contiguous spectrum waveform time samples. The matched filter block is transformed to produce the contiguous spectral components.

The processing function may include weighting and combining the non-contiguous spectral components to produce one or more received symbol values. The weighting and combining may include weighting the non-contiguous spectral components using a complex conjugate of a weighting applied at a transmitter that transmits the information. The weighting can further include weighting non-contiguous spectral samples using an estimate of phase changes of each sample induced by a propagation path from the transmitter to the receiver. Such weighting permits information decoding when the propagation path includes interference from the same transmitter and interference from a different transmitter.

The weighting applied at the transmitter may be, for example, a vector of weighting values selected from a set of orthogonal codes. A first weighting and combining is performed using the complex conjugate of a first vector of weighting values to produce a first data symbol value and a second weighting and combining is performed using the complex conjugate of a second vector of weighting values to produce a second data symbol value.

BRIEF DESCRIPTION OF THE DRAWINGS

Various objects, features, and advantages will be apparent from the following more particular description of the accompanying drawings in which reference characters refer to the same parts throughout the various views.

FIGS. 3A and 3B illustrate the spectral response resulting from truncating the time domain signal using a shaping function;

DETAILED DESCRIPTION

Figure 1:
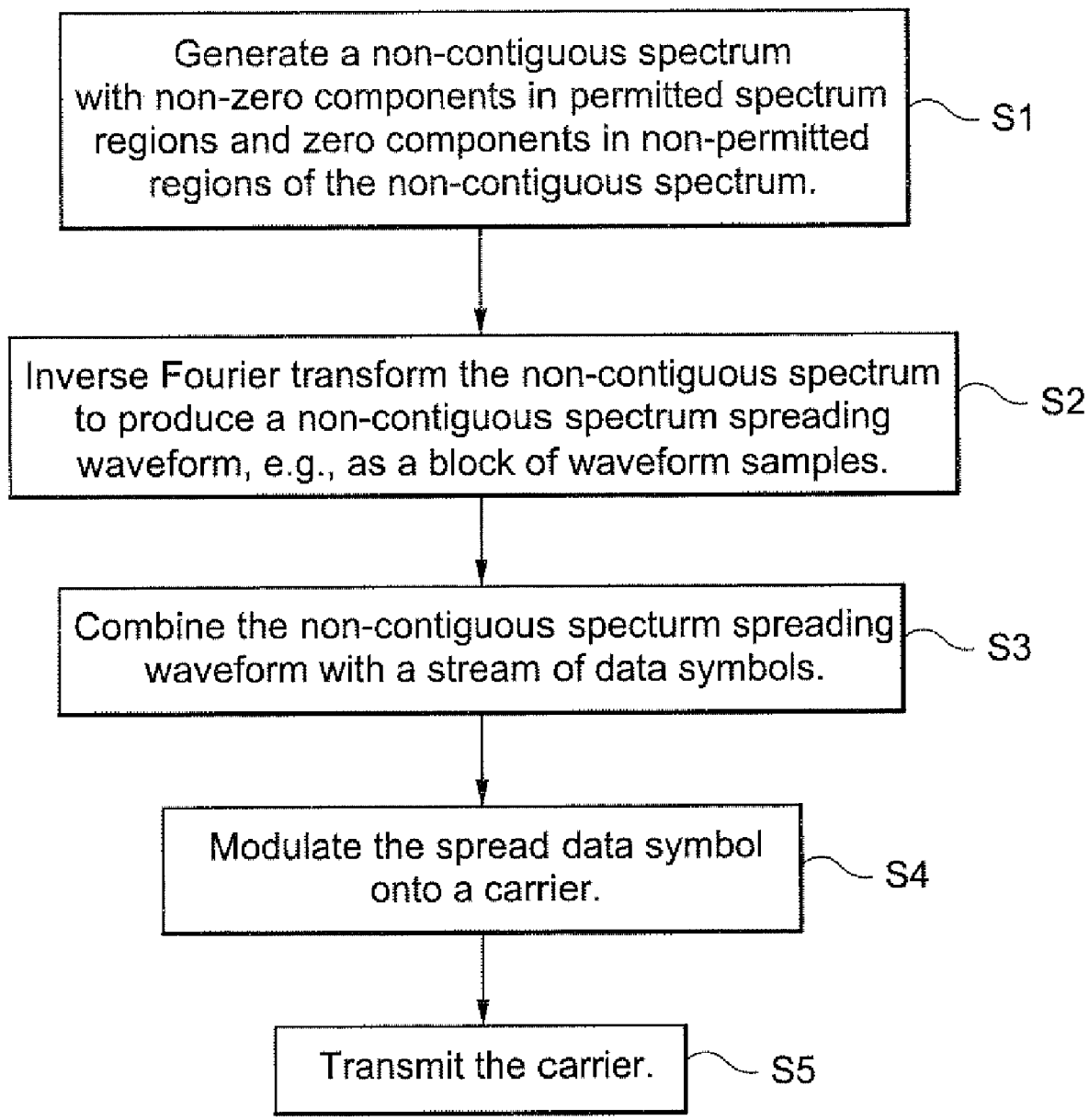
FIG. 1 is a flowchart diagram illustrating non-limiting example procedures for generating and combining a non-contiguous spectrum spreading waveform with data symbols for radio transmission.

In the following description, for purposes of explanation and not limitation, specific details are set forth such as particular architectures, interfaces, techniques, etc. in order to provide a thorough understanding. However, it will be apparent to those skilled in the art that other embodiments that depart from these specific details may be employed. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

A vector of values is selected from a limited alphabet of values, e.g. the binary values +1 and −1, so that the vector is orthogonal to other vectors in a set of mutually orthogonal vectors. The values of the vector are regarded as the signs or multiplier coefficients of corresponding sine or cosine waveforms. Each sine or cosine waveform has a frequency centered on an allowed portion of spectrum, such as a frequency channel, in an allocated band of frequency spectrum. When the allowed portions of spectrum are non-contiguous, zero coefficients are inserted between elements of the vector corresponding to the locations of the non-allowed or unavailable portions of spectrum. The resulting vector, expanded by the insertion of zeros, is then inverse Fourier transformed to produce a waveform, the spectrum of which is substantially constrained to the allowed portions of spectrum. In one non-limiting implementation, pulse-shaped OFDM may be used to limit undesired truncation effects on the spread signal waveform in the allowed portions of spectrum. In any event, the non-contiguous spectrum spreading waveform is used to multiply narrowband data-modulated waveforms to obtain a spread-spectrum signal that is only spread over the allowed portions of the spectrum, thereby producing a non-spectrally-contiguous CDMA signal.

Other vectors from the set may be selected to produce orthogonal CDMA signals, while still being spectrally constrained to the allowed portions of the spectrum. Non-limiting example variations in the order of combining the spectral vector sine/cosine waveforms, the orthogonal vectors, and the data streams to be transmitted are described below that have advantages in particular applications.

Table 1 below illustrates a non-limiting example construction of a number of mutually orthogonal codewords in the spectral domain, referred to as spectral vectors, that occupy non-contiguous spectrum.

TABLE 1

| +1 | +1 | +1 | 0 | 0 | +1 | +1 | 0 | +1 | +1 | +1 |
|----|----|----|---|---|----|----|---|----|----|----|
| +1 | +1 | +1 | 0 | 0 | +1 | −1 | 0 | −1 | −1 | −1 |
| +1 | +1 | −1 | 0 | 0 | −1 | +1 | 0 | +1 | −1 | −1 |
| +1 | +1 | −1 | 0 | 0 | −1 | −1 | 0 | +1 | +1 | −1 |
| +1 | −1 | +1 | 0 | 0 | −1 | +1 | 0 | −1 | +1 | −1 |
| +1 | −1 | +1 | 0 | 0 | −1 | −1 | 0 | +1 | −1 | +1 |
| +1 | −1 | −1 | 0 | 0 | +1 | +1 | 0 | −1 | −1 | +1 |
| +1 | −1 | −1 | 0 | 0 | +1 | −1 | 0 | +1 | +1 | −1 |

The location of the zero values indicates spectrum that should not be occupied by the spread signal, while the non-zero values indicate spectral locations that will be occupied. Examining only the non-zero values, it can be seen that each row is a code of the Walsh-Hadamard set of order 8. Other orthogonal sets may be used. For example, sets of orthogonal Fourier sequences may be constructed for any desired number of non-zero points, while Walsh-Hadamard codes are a length equal to a power of two, such as the length 8 codes exemplified above. It is also possible to scramble orthogonal code sequences. For example, Walsh-Hadamard codes may be scrambled by multiplying corresponding elements of each code by the same complex factor of magnitude unity. The order of the elements of each code may also be scrambled without destroying their mutual orthogonality provided that the same scrambling order is used for each code. In this way, a variety of orthogonal code sets may be produced for allocating to different groups of users in adjacent service areas.

When an inverse Fourier Transform (IFT) is performed on one of these 11-element spectral vectors, the result is a time domain waveform that can be used for data transmission as described below. The other spectral vectors, when similarly transformed, result in other time domain waveforms that can be used to spread and transmit other data at the same time over the same channel without mutual interference. A receiver for such a non-contiguous spread spectrum signal captures the received waveform in the time domain and performs a Fourier Transform (FT) on it to reconstruct the spectral vector. The reconstructed spectral vector is then correlated with a pre-stored version of the actual spectral vector to determine the transmitted data.

Figure 5:
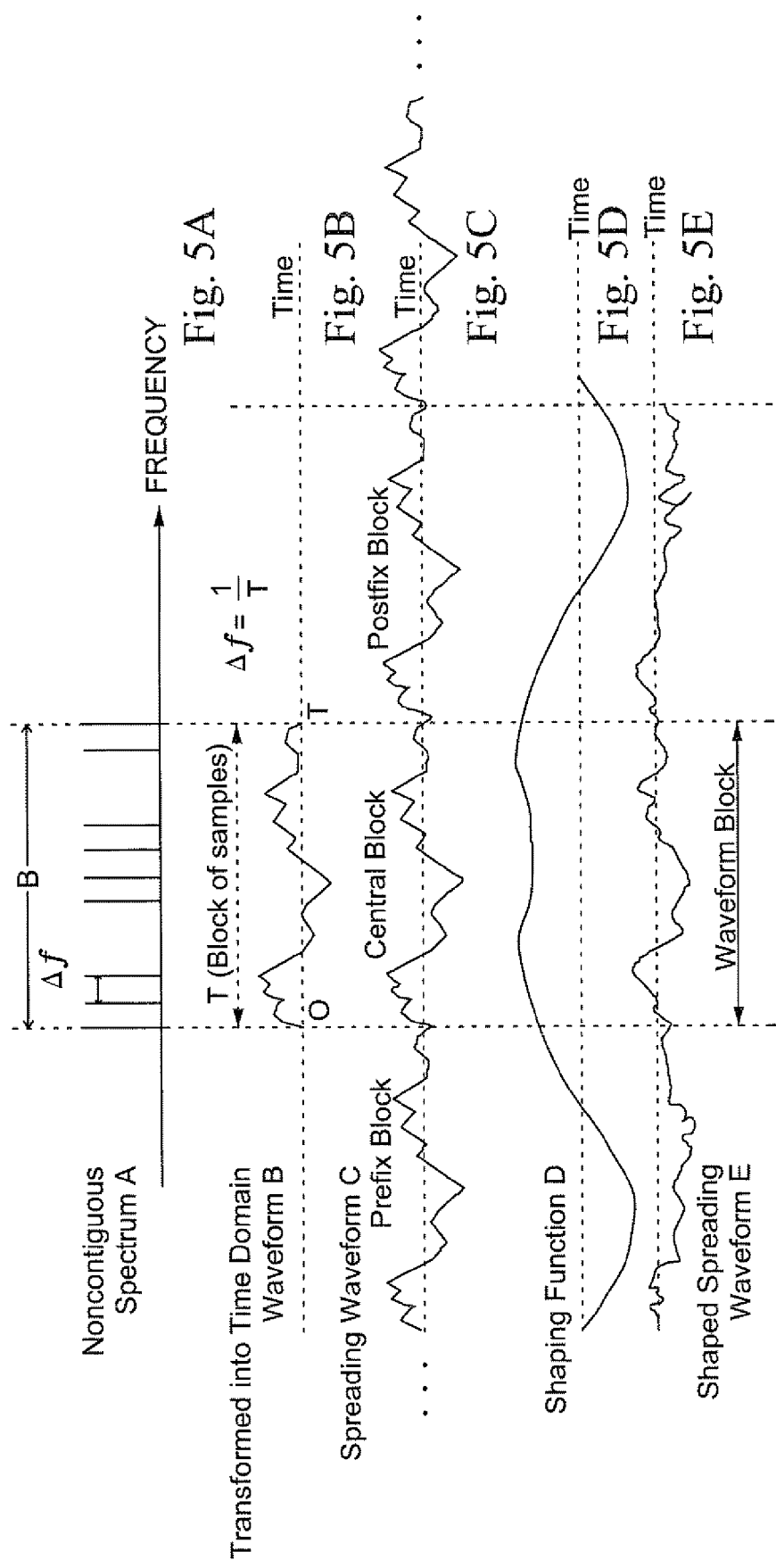
FIGS. 5A-5E show an non-limiting example construction of a non-contiguous spectrum spreading waveform.

The 11-element example spectral vectors set forth above can be "padded out" using leading and trailing zeros to obtain a composite number of elements such as a power of two, so that an inverse Fast Fourier Transform (IFFT) can be employed. For example, the above 11-element spectral vector could be padded out to 16 elements. The resulting 16 time samples (after IFFTing the 16-element spectral vector) are then transmitted at a proper rate to obtain the desired spectrum. The proper rate is that sample rate that results in the spectral energy falling in the designated spectral regions and that completes transmission of the block of samples in a time "T" equal to the reciprocal of the spacing of adjacent spectral lines ($\Delta f$), i.e., T=1/$\Delta f$ (see FIG. 5 for an illustration). The receiver may sample the received waveform at the same rate in order to decode the data. Data modulation in the transmitter may be accomplished by multiplying the non-contiguous spectrum spreading waveform obtained from the IFT or IFFT by a complex data symbol non-limiting examples of which include a QPSK symbol or a 16-QAM symbol. The symbol value is constant over the time period T containing the block of samples corresponding to the non-contiguous spectrum spreading waveform. Either or both of the transmitter and the receiver may use oversapling to facilitate transition between discrete-time samples and continuous waveforms. Namely, finer time-sampling may be used so that less complicated and/or expensive smoothing or band-limiting filters are needed.

FIG. 1 is a flowchart diagram illustrating non-limiting example procedures for generating and combining a non-contiguous spectrum spreading waveform with data symbols for radio transmission. A non-contiguous spectrum is generated having non-zero components in permitted regions of the electromagnetic spectrum and zero components in non-permitted regions of the electromagnetic spectrum (step S1). The non-contiguous spectrum is transformed to produce a non-contiguous spectrum spreading signal (step S2). One example transform is the Fourier transform. Other transformations could be used, e.g., a FFT. The information is processed into a stream of data symbols. The non-contiguous spectrum spreading signal and a data symbol from the stream are combined to produce a data modulated signal (step S3). The data modulated signal is then modulated onto a carrier signal having a desired center frequency (step S4) to produce a signal for transmission and transmitted. Data modulated signals produced by successive data symbols from the stream may be overlapped to produce a transmission signal.

In one non-limiting example implementation, producing a non-contiguous spectrum spreading signal includes performing an inverse Discrete Fourier Transformation on the non-contiguous spectrum to produce a sequence of time waveform samples. In this case, combining the non-contiguous spectrum spreading signal and a data symbol from the stream to produce the data modulated signal includes multiplying the data symbol value with each sample of the sequence of time waveform samples. Samples of the resulting shaped non-contiguous spectrum spreading signal may be stored in memory.

In another non-limiting example implementation, producing a non-contiguous spectrum spreading signal includes allocating a complex number to represent an amplitude and phase of each non-zero component of the non-contiguous spectrum and a zero value to represent the zero spectral components. Then, combining the non-contiguous spectrum spreading signal and a data symbol from the stream to produce a data modulated signal includes multiplying the data symbol value with each of complex numbers to generate a set of products. An inverse Discrete Fourier Transform is performed on the set of products to produce the data modulated signal.

Figure 2:
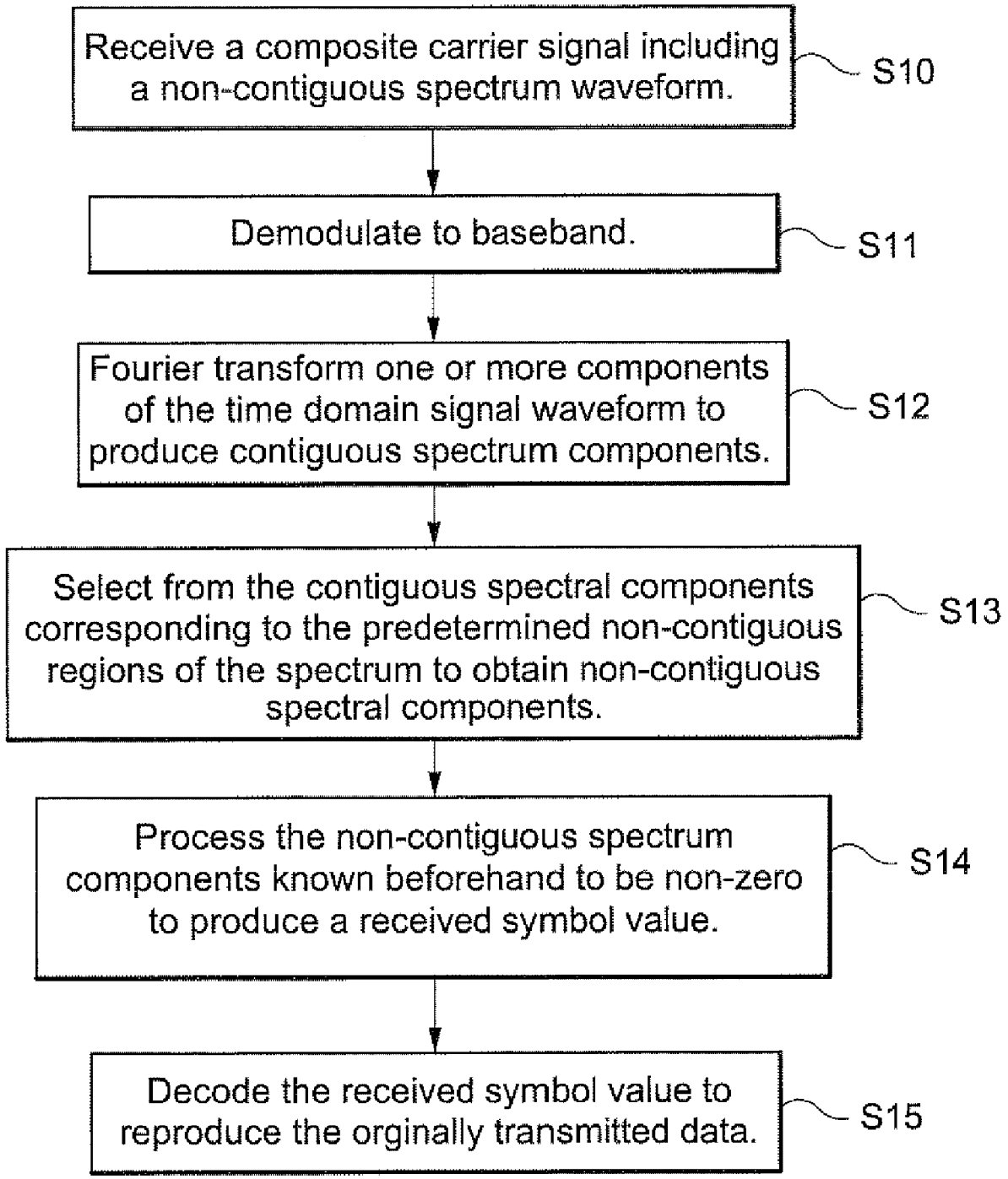
FIG. 2 is a flowchart diagram illustrating non-limiting example procedures for receiving and despreading a signal spread over a non-contiguous spectrum.

At the receiver, a reverse set of operations is performed. FIG. 2 is a flowchart diagram illustrating non-limiting example procedures for receiving and despreading a signal that occupies predetermined regions of the electromagnetic spectrum. A signal comprising a signal waveform in the time domain containing a non-contiguous spectrum signal is received (step S10), and downconverted to baseband (step S11). One or more components of the time domain signal waveform are transformed to produce contiguous spectral components (step S12). Contiguous spectral components corresponding to the predetermined non-contiguous regions of the spectrum are selected to obtain non-contiguous spectral components (step S13). The non-contiguous spectral components are processed to produce one or more received symbol values (step S14). The received symbol values are then decoded to reproduce the information. (step S15).

The non-contiguous spectrum spreading waveform may be modulated with successive complex data symbols to generate an "unshaped" data transmission. But an unshaped transmission leaks energy into unavailable areas of the spectrum where no energy was intended, not licensed, etc. The leaking into the spectral locations having zero values in the above spectral vectors is due to the discontinuity between successive modulating symbols imparting a sin(x)/x (sinc) shaped spread to each spectral point, as depicted by FIGS. 3A and 3B. As is well known, the Fourier transform assumes that the waveform is repetitive. In FIG. 3A, the same block of time samples of the waveform, where the length of the block corresponds to the frequency bandwidth B of the non-contiguous spectrum (see an illustration in FIG. 5), is repeated an infinite number of times. The corresponding spectrum in this case are the thin spectral lines shown at the bottom of FIG. 3A. In contrast, FIG. 3B shows that if the repeated blocks of time samples are truncated, the corresponding spectrum broadens resulting in leakage into adjacent frequencies. The spectrum of each broadened spectral line will be the same as that of the shaping function. Fortunately, this leakage problem can be significantly reduced using a "shaped" data transmission, analogous to pulse-shaped OFDM, as described later.

For an example of unshaped data transmission, consider the use of QPSK data symbols. Each QPSK data symbol can take on any of the four values 1, j, −1, or −j representing respectively the bit-pairs 00, 01, 11, and 10. Using the first of the above example spectral codes from Table 1, the signal which would be transmitted for the 4-symbol data sequence 1, 1, j, −1 would be formed as the IFT of the following data-modulated spectral vectors: (+1 +1 +1 0 0 +1 +1 0 +1 +1 +1) for symbol "1"; (+1 +1 +1 0 0 +1 +1 0 +1 +1 +1) for symbol "1"; (+j+j +j 0 0 +j +j 0 +j +j +j) for symbol "j"; and (−1 −1 −1 0 0 −1 −1 0 −1 −1 −1) for symbol "−1". The data modulation then corresponds to multiplying each symbol value by a spectral vector (+1+1 +1 0 0 +1 +1 0 +1 +1 +1). Each data-modulated spectral vector is then inverse Fourier transformed (IT) into IFT values. The IFT values are concatenated to form a time domain signal for transmission via an RF carrier. Alternatively, the same time domain signal to be transmitted can be formed by first performing an IFT on the unmodulated spectral vector, which has the benefit of only requiring a single IFT type operation the results of which can be stored and reused, and then multiplying each data symbol by each successive element of the transformed waveform vector.

As mentioned above, the Fourier transform assumes the waveform transformed is repetitive/repeating. Consider as one example, a 16-symbol block repeated three times so that there is a cyclic prefix block of samples, a central block of samples, and a cyclic postfix block of samples. There can be more cyclic prefix blocks and postfix blocks. The cyclic prefix and postfix blocks are preferably successively reduced in amplitude moving away from the central block in order to smooth out truncation effects. The entire train of blocks of one symbol may overlap the train of blocks used for a neighboring symbol. A weighting function for the cyclic prefix and postfix blocks is selected to have the Nyquist property such that interference between successive symbols may be avoided.

Figure 4:
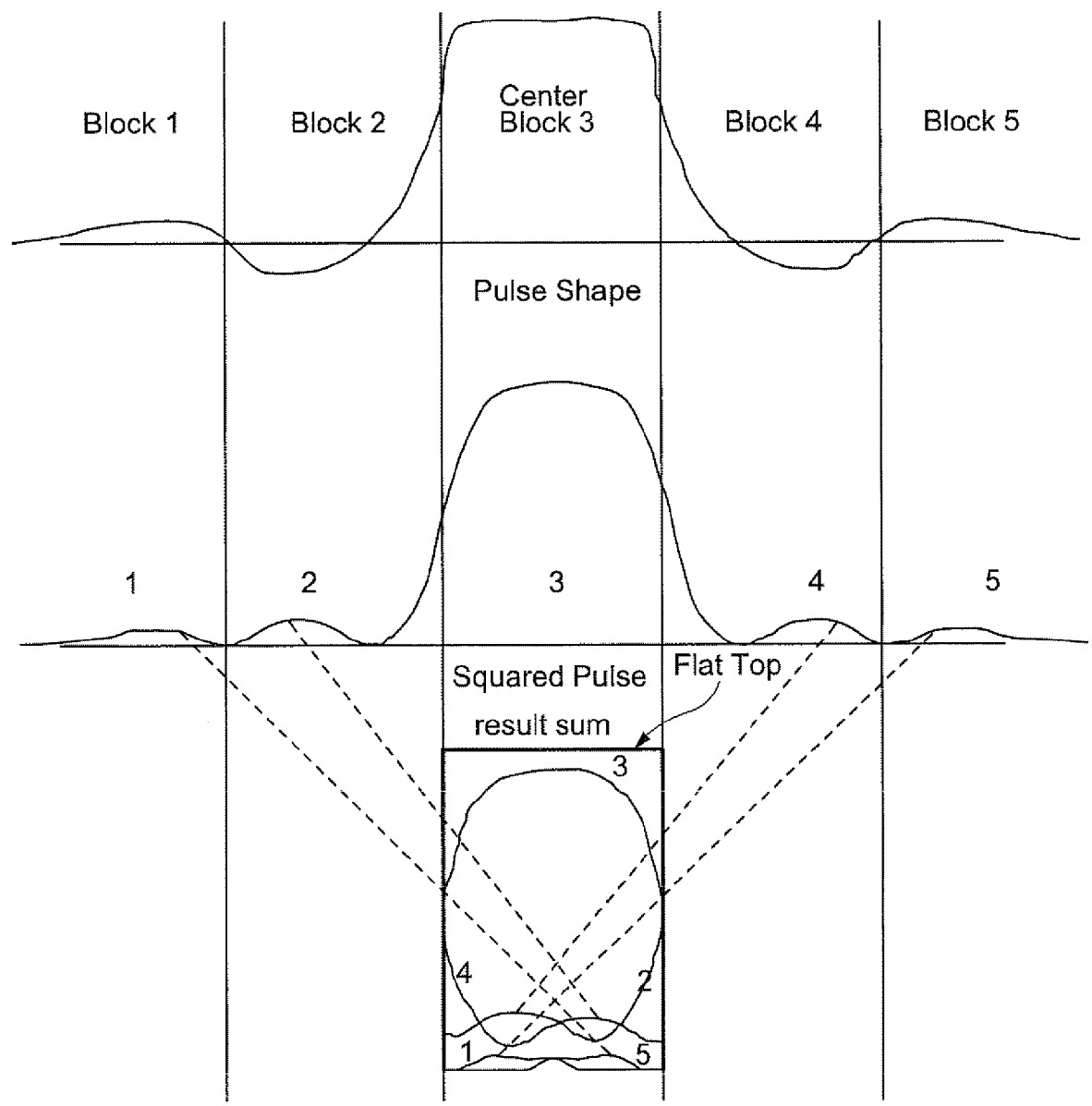
FIG. 4 illustrates in graphical form a receiver processing using a matched filter with the same waveform shaping function used in the transmitter.

Subsequently, at the receiver, the prefix and postfix blocks are weighted and added to the main block of received samples using the same weighting function. Thus, the combined sample blocks will have been weighted with the square of the shaping function. An illustration of this is shown in FIG. 4 for five successive blocks. The top waveform corresponds to the shaping function. The middle waveform corresponds to the matched filter output at the receiver in which the same shaping waveform is applied effectively squaring the shaping waveform. The shaping function has the Nyquist property in the frequency domain if, upon superimposing repeated blocks each weighted with a section of the square of the shaping function, the net weight applied to every sample is equal. The transition from the middle graph to the bottom graph in FIG. 4 shows an example of superpositioning. The result is a pulse (shown in bold) with a net "flat" top.

The shaping function has the Nyquist property in the time domain if the product of the shaping unction with itself delayed by one or more whole blocks has an integral (or mean value) of zero. The latter property avoids a data symbol being corrupted by intersymbol interference (ISI) from adjacent symbols even though overlapped by the diminishing tails of their shaped prefix and postfix blocks. Approximations to Nyquist shaping may also be used, such as shaping with a Gaussian function, as a certain amount of ISI between data symbols can often be tolerated and removed by processing despread symbol values with an equalizer such as a Viterbi Maximum Likelihood sequence estimator.

FIGS. 5A-5E show a non-limiting example construction of a non-contiguous spectrum spreading waveform. FIG. 5A shows a non-contiguous spectrum A with spectral lines at some frequencies and no spectral lines at other frequencies in between. The bandwidth of the non-contiguous spectrum A is designated as B. The frequency spacing between adjacent spectral lines is designated $\Delta f$. A time domain waveform B corresponding to the non-contiguous frequency spectrum shown in FIG. 5A is shown in FIG. 5B. That time domain waveform may be obtained by performing a Fourier Transform of the non-contiguous frequency spectrum shown in FIG. 5A. The waveform in FIG. 5B is shown as a continuous curve, but in practice it is more likely to consist of discrete points depending on how many points are calculated by the Fourier Transform. The spacing between the samples corresponds to 1/B. The waveform "block" in the time domain corresponding to the non-contiguous spectrum A in the frequency domain is shown as lasting for a time period T, where T is the duration in which the block of samples must be transmitted.

As explained above, the waveform B in FIG. 5B will only have the exact frequency spectrum of the non-contiguous spectrum A in FIG. 5A if the waveform B is repeated an infinite number of times, as illustrated in FIG. 5C entitled "Spreading Waveform C," which repeats forever as indicated by the dotted lines extending to the right and left. But if waveform B is repeated only a finite number of times, and those waveform B copies to the left and right of the central waveform copy gradually taper off, the result is a broadening of the spectral lines from a zero width, as depicted in FIGS. 3A and 5A, to a shape which is the Fourier transform of the shaping function, as depicted in FIG. 3B. An example of a shaping/tapering function D is shown in FIG. 5D.

A finite tapering function may be used if the truncation is chosen to meet a desired constraint on approximating the spectrum in FIG. 5A. In this case, the desired constraint is that the spectral energy in the unavailable regions of the spectrum is below a desired maximum level. The desired maximum level determines the extent of the tapering function. The shape of the tapering function waveform is preferably chosen to have the Nyquist property, as described above, such that when the receiver weights and adds repeat blocks using the same shaping function, the sum will be substantially zero for data symbols separated by one block duration from the current symbol. Meeting this Nyquist property minimizes intersymbol interference between data symbols.

The shaped spreading waveform E in FIG. 5E illustrates the product of the waveforms C and D and has the same finite extent in time as the shaping function D shown in FIG. 5D. Because it is finite and does not at this stage depend on variable data symbols, the shaped, non-contiguous spectrum spreading waveform E can, if desired, be pre-computed and stored in memory. For example, a non-contiguous spectrum spreading waveform for each spectral vector may be pre-computed and stored.

Different data stream transmissions may be distinguished using different non-contiguous spectrum spreading waveforms. The different data streams may belong to different users, or may all belong to the same user as a way of increasing data throughput rate. The latter technique is known as "Multicode" operation.

Figure 6:
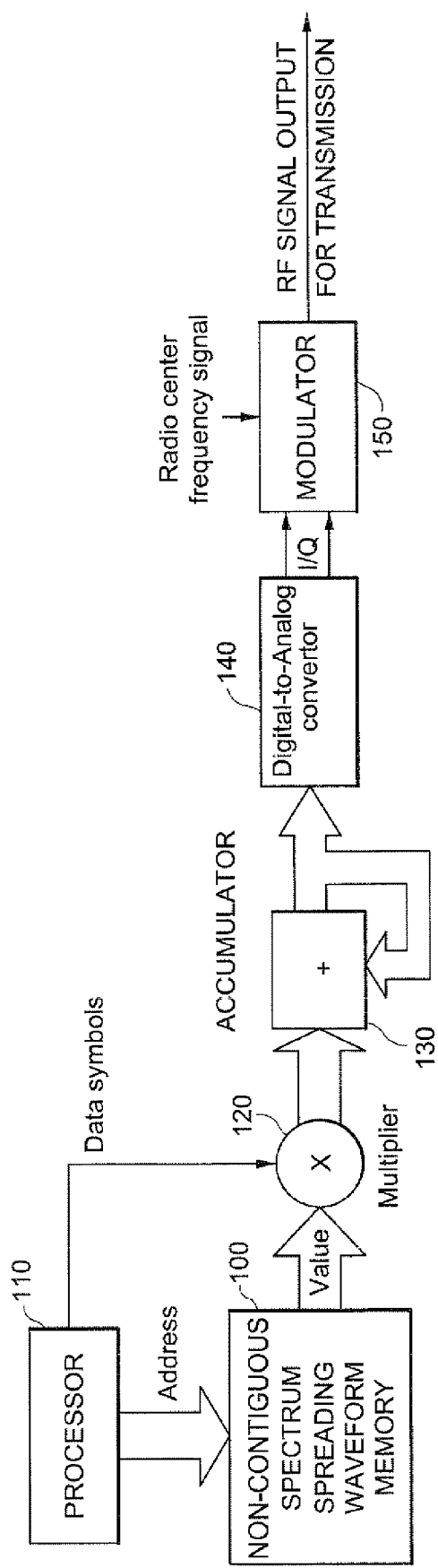
FIG. 6 is a function block diagram of a non-limiting example apparatus for combining a spreading waveform for a non-contiguous spectrum with data symbols for radio transmission.

The function block diagram in FIG. 6 illustrates how the shaped, non-contiguous spectrum spreading waveform can be combined with data symbols for transmission. The interconnections between the functional units show signal flow paths, but it is understood that other interconnections, such as control, power, clocks, and timing signals may be present in a practical design. A data processor 110 generates a sequence of addresses to read from a non-contiguous spectrum spreading waveform memory 100 digital values representing points on the shaped, non-contiguous spreading waveform, such as waveform E shown in FIG. 5E. Of course, other shaped, non-contiguous spreading waveforms may be used at different times or simultaneously for multicode operation. The shaped, non-contiguous spreading waveform may be complex, having a real part and an imaginary part, and the values read from memory 100 are the also complex values, having a real part and an imaginary part. To simplify the description and illustration, however, only one part is shown in FIGS. 5A-5E.

The non-contiguous spectrum spreading waveform values read from the memory 100 are combined with successive data symbol values in a multiplier 120 to generate a data modulated signal. The multiplier 120 may be a real multiplier if both data and waveform values are real, a half-complex multiplier if the waveform values are complex and the data values are real as in binary bits, vice versa if the waveform values are real and the data values are complex as in 8-PSK or 16 QAM values, or a full complex multiplier if both the waveform values and the data values are complex.

New data values are combined with the shaped, non-contiguous spreading waveform E shown in FIG. 5E every block period T, even though the waveform duration is longer than T, for example 3T as shown in FIGS. 5A-5E. As a result, the shaped tail of the postfix of the previous data symbol waveform overlaps the center block of the current data symbol waveform, and the shaped prefix tail of the current data symbol waveform overlaps the center block of the previous symbol. Likewise, the prefix and postfix tails of the current and subsequent symbol overlap. If the combined length of the prefix tail, center block, and postfix tail is for example three block durations, i.e., 3T as is the case in FIGS. 5A-5E, then each transmitted signal sample will be the sum of contributions from the three overlapping data symbol waveforms. This summation may be performed by accumulator 130. If a waveform block of duration T is represented by N samples indexed by i=0 to N−1, and the total length of the shaped, non-contiguous spectrum spreading waveform shown in FIG. 5E is 3N samples corresponding to the composite transmit waveform having an index that can vary from −N to 2N−1, then the function performed (under the control of processor 110) by the multiplier 120 and the accumulator 130 to generate a k'th block of N output samples during the period of data symbol Data(k) may be mathematically described by:

$$\text{Output}(k,i) = \text{Data}(k-1) \ast \text{WaveformSample}(i+N) + \text{Data}(k) \ast \text{WaveformSample}(i) + \text{Data}(k+1) \ast \text{WaveformSample}(i-N) \quad (1)$$

By extension, if the non-contiguous spreading waveform shown in FIG. 5E has a duration of 5T represented by 5N samples, then equation (1) would have five terms instead of only three.

As mentioned previously, all the quantities in equation (1) can be complex, so the accumulator output values can comprise real and imaginary parts. The output values are fed to a digital-to-analog (D-to-A) converter 140, which can comprise two D-to-A converters to convert, respectively, the real accumulator output value to a real analog signal I and the imaginary accumulator output value to an imaginary or Quadrature analog signal Q. The complex I, Q signals then drive a quadrature modulator 150 which modulates a radio center frequency or carrier signal with the I, Q waveforms to produce the radio frequency (RF) signal for transmission.

When constructed according to the above, the transmitted radio signal occupies non-contiguous areas of RF spectrum in a particular RF band, but does not occupy other areas of RF spectrum within that particular RF band that lie in between two or more of the non-contiguous areas and which are unavailable to that particular transmission. The unavailable spectrum may be allocated to other services or signals. The suppression of energy in the unavailable spectrum is improved using the pulse shaping function shown in FIG. 5D. The non-contiguous spectrum may be calculated using simulation techniques in order to optimize the design. There are many suitable shaping functions, such as the known IOTA pulse disclosed in U.S. Pat. No. 6,278,686, that have the desirable Nyquist property providing good spectral containment.

Radio signals constructed starting with a spectral vector like that shown in FIG. 5A having different orthogonal sign patterns, such as ++++++++++ and +−+−+−+−+−, will be orthogonal to each other, which means that their cross-correlations with each other and with all the other spectral vectors in the set are zero or are least minimal. In practical terms, orthogonality means that a signal using one vector to generate its spreading waveform will be substantially non-interfering with a signal using a different vector. So using different code vectors allows different users to communicate using the same spectrum without mutual interference. Thus, the system described here has the characteristics of an Orthogonal Code Division Multiple Access (OCDMA) system. Such orthogonality is preferred when it can be achieved, but non-orthogonal CDMA can also be used, in which case random vectors could be selected.

Orthogonality requires that orthogonal signals be time-aligned to an accuracy of some fraction of the reciprocal of the total bandwidth B of the spectrum. This is readily achievable for transmissions from the same base station, but transmissions from different mobile terminals cannot be so readily synchronized. Therefore, orthogonality may be used on the downlink (base-to-mobile) but relinquished on the uplink (mobile-to-base). Other interference reduction techniques may be used in the base station to mitigate interference between different users on the uplink, such as multi-user detection, successive detection with interference subtraction, etc.

In the case where the number of non-zero spectral lines is a power of two, a set of orthogonal sign patterns is given by the Walsh functions, which are binary sequences of +1 or −1. In the case where the number of non-zero spectral lines is not a power of two, orthogonal sequences may be given by the Fourier sequences, where w stands for the principal Nth root of unity, $e^{j2\pi/N}$ $$\begin{array}{l} 1\ 1\ 1\ 1\ 1\ 1\ 1 \\ 1\ w\ w^2\ w^3\ w^4\ w^5\ w^6 \\ 1\ w^2\ w^4\ w^6\ w\ w^3\ w^5 \\ 1\ w^3\ w^6\ w^2\ w^5\ w \\ \text{etc} \end{array}$$

Because Fourier sequences are complex, the resulting non-contiguous spreading waveforms are also complex.

As in conventional, contiguous spectrum CDMA systems, the orthogonality of different signals in a non-contiguous spectrum CDMA system is degraded by multipath propagation. The manner in which orthogonality is degraded by multipath for a conventional contiguous spectrum CDMA system and a non-contiguous spectrum CDMA system is described below.

In conventional CDMA using orthogonal codes, two time-aligned signals using different codes are orthogonal and there cross-correlation is theoretically zero. But due to multi-path propagation, delayed reflections of one signal may be received that are not time-aligned with the undelayed ray of another signal. The codes that are not time-aligned are not orthogonal, but have a non-zero cross correlation, which on average is 1/root(N), where N is the code length in chips. Thus, non-orthogonality in conventional CDMA is explained by the time-domain characteristics of the propagation path. It is possible to restore orthogonality in conventional CDMA by passing the signal through an inverse shaping filter, which effectively undoes the multi-path propagation. Unfortunately an inverse filter can be mathematically ill-conditioned, resulting in magnification of noise and interference from other transmitters, e.g., other cellular base stations. Commonly-owned U.S. Pat. No. 5,572,552 to Dent et al, incorporated here by reference, describes that a hybrid between an inverse channel filter and a matched filter can provide optimum performance when there is both same-cell and other-cell interference.

Two generated non-contiguous spectrum spreading waveforms are derived from corresponding spectral lines that are rotated or sign-changed according to orthogonal sequences produce orthogonal radio signals. Those signals remain orthogonal if the relative amplitudes and phases of the spectral lines remain unchanged through the propagation path. In the downlink from a cellular base station transmitting multiple signals to a radio terminal, corresponding spectral lines of each signal suffer the same phase rotation, so this does not affect orthogonality provided that phase rotation is compensated in a channel estimation used when despreading a signal. In the uplink from multiple mobile terminals to a base station, however, corresponding spectral lines do not necessarily suffer the same phase shift, so it is much harder to totally restore orthogonality by compensation. Accordingly, many cellular systems are content to use non-orthogonal codes on the uplink.

Returning to the downlink, multi-path propagation across the occupied spectrum disrupts the constant, equal amplitudes of the individual spectral components. As a result, when a composite signal comprising the sum of many non-contiguous spectrum spreading waveforms is received and correlated with one of the non-contiguous spectrum spreading waveforms, the other non-contiguous spectrum spreading waveforms will produce a non-zero correlation output Orthogonality may be restored by first flattening the received spectrum so that all spectral lines of each signal are of equal amplitude. The flattening process is equivalent to the inverse channel filter that can be used in conventional CDMA to restore downlink orthogonality. As in the case of conventional CDMA, a compromise hybrid between a matched filter and an inverse channel filter that does not quite flatten the spectrum is likely to provide optimal performance when interference is partly same-cell and partly other-cell interference and noise.

Figure 7:
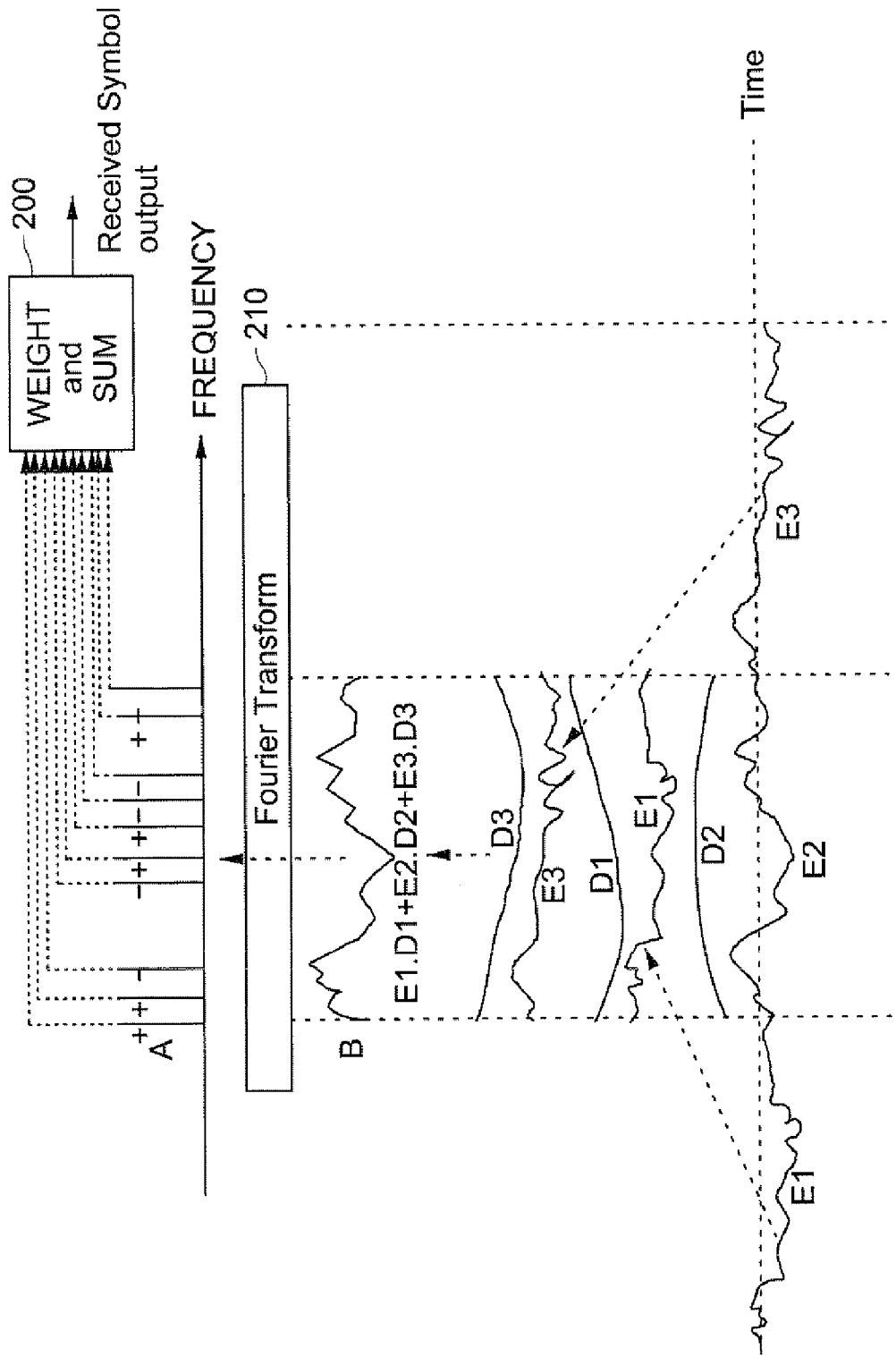
FIG. 7 is a function block diagram of a non-limiting example apparatus for implementing a correlation method at a radio receiver.

FIG. 7 is a function block diagram of a non-limiting example apparatus for implementing a correlation method at a radio receiver. The receiver correlation process is the inverse of the waveform construction process, an example of which was shown in FIGS. 5A-5E. That non-limiting example is continued here on the receive side. Assuming the length of the shaping function shown in FIG. 5D is 3T, the received composite waveform contains information on a current symbol in 3 segments, labeled E1, E2 and E3 at the bottom of FIG. 7. These three segments are copies of the time waveform from FIG. 5B weighted by the corresponding three shaping function segments D1, D2, and D3 of the shaping function D shown in FIG. 5D.

As already explained, the prefix tail of the following symbol and the postfix tail of the previous symbol overlap the central signal block of the current symbol due to the extended shaping function needed for spectral control. Accordingly, the received composite signal is filtered by a matched filter which weights the received signal segments E1, E2, and E3 with the same shaping function as used at the transmitter, namely shaping segments D1 (the prefix tail), D2 (the central block), and D3 (the postfix tail). The weighted segments are summed together to produce a received time domain waveform (similar to that shown in FIG. 5B) equal to D1*E1+ D2*E2+D3*E3.

When the shaping function has the Nyquist property, the resulting weighted and combined signal sample block will have a flat weighting across the block (illustrated by the flat top of the pulse waveform shown in FIG. 4). This waveform relationship occurs when $D^2(i-N)+D^2(i)+D^2(i+N)=1$, where i is the index of a sample of the shaping function D, which is a desirable constraint on the design of the shaping function. Thus, when the reconstructed received waveform B shown in FIG. 7 is Fourier transformed at block 210, the noncontiguous spectrum A shown in FIG. 5A for the transmitter will be reproduced, albeit modified by the addition of noise and interference and the frequency response shaping effect of multi-path propagation. The spectral lines output from the Fourier Transform function 210 are then combined in a weighted summer 200 to produce a received symbol output.

The weighting factors used for the spectral lines can be the complex conjugate of the spectral line weights used in waveform construction at the transmitter shown in FIG. 6. The weighting factors can also correct for phase changes of each spectral line due to multi-path propagation which are derived by forming channel estimates. A channel estimate may be obtained using one or more known pilot sequences modulated on to one of the orthogonal codes. An example of this channel estimation technique is well known for example in the IS-95 CDMA system. The weighting functions may alternatively be calculated from an estimated channel and estimations of same-cell and other-cell interference in such a way as to provide optimum detection of symbols as described in U.S. Pat. No. 5,572,552.

In the case of multicode operation, the receiver may despread using multiple despreading waveforms to obtain multiple despread complex values per data symbol period. These multiple values can be regarded as a vector of despread values, and from the sequence of despread vectors, a corresponding sequence of vectors of data symbols is to be decoded. U.S. Pat. No. 6,963,532, incorporated by reference, describes Block Decision Feedback Equalizers (Block DFEs) for equalizing interference between successive data symbol vectors, termed InterVector Interference (IVI) therein.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method of communicating information using code division multiple access signals that occupy predetermined, non-contiguous regions of the electromagnetic spectrum, comprising the following steps:

generating a non-contiguous spectrum having non-zero components in permitted regions of the electromagnetic spectrum and zero components in non-permitted regions of the electromagnetic spectrum;

producing a non-contiguous spectrum spreading signal associated with the non-contiguous spectrum by performing a Discrete Fourier Transformation on the non-contiguous spectrum to produce a sequence of time waveform samples;

processing the information into a stream of data symbols;

combining the non-contiguous spectrum spreading signal and a data symbol from the stream to produce a data modulated signal, the combining including multiplying the data symbol with each sample of the sequence of time waveform samples;

modulating the data modulated signal on to a carrier signal having a desired center frequency to produce a signal for transmission; and transmitting the transmission signal.

2. The method of claim 1, further comprising:

repeating a block of signal samples corresponding to the non-contiguous spectrum spreading signal, and weighting successive samples from the repeated blocks using a shaping function to produce a shaped, non-contiguous spectrum spreading signal used in the combining.

3. The method in claim 1, wherein the step of producing a non-contiguous spectrum spreading signal comprises allocating a complex number to represent an amplitude and phase of each non-zero component of the non-contiguous spectrum and a zero value to represent the zero spectral components, and wherein the step of combining the non-contiguous spectrum spreading signal and a data symbol from the stream to produce a data modulated signal comprises:

multiplying the data symbol value with each of the complex numbers to generate a set of products, and performing a Discrete Fourier Transform on the set of products to produce the data modulated signal.

4. The method in claim 1, further comprising:

repeating a block of signal samples corresponding to the data modulated signal, and weighting successive samples from the repeated blocks using a shaping function to produce a shaped data modulated signal.

5. The method in claim 1, further comprising:

selecting a sequence from a set of orthogonal codes;

using the sequence to generate the non-contiguous spectrum and to determine a phase of successive non-zero spectral components;

producing a first data modulated signal using a first code from the set of orthogonal codes;

producing at least a second data modulated signal using a second code from the set of orthogonal codes;

combining the first and at least the second data modulated signals to produce a composite modulating signal; and using the composite modulating signal in the modulating step.

6. Apparatus for use in a transmitter for communicating information using code division multiple access signals that occupy predetermined, non-contiguous regions of the electromagnetic spectrum, comprising electronic circuitry configured to:

generate a non-contiguous spectrum having non-zero components in permitted regions of the electromagnetic spectrum and zero components in non-permitted regions of the electromagnetic spectrum;

produce a non-contiguous spectrum spreading signal associated with the non-contiguous spectrum by performing a Discrete Fourier Transformation on the non-contiguous spectrum to produce a sequence of time waveform samples;

process the information into a stream of data symbols;

combine the non-contiguous spectrum spreading signal and a data symbol from the stream to produce a data modulated signal by multiplying the data symbol value with each sample of the sequence of time waveform samples; and modulate the data modulated signal on to a carrier signal having a desired center frequency to produce a signal for transmission.

7. The apparatus in claim 6, wherein the electronic circuitry is configured to:

repeat a block of signal samples corresponding to the non-contiguous spectrum spreading signal, and weight successive samples from the repeated blocks using a shaping function to produce a shaped, non-contiguous spectrum spreading signal used in the combining.

8. The apparatus in claim 6, wherein the electronic circuitry is configured to produce a non-contiguous spectrum spreading signal by allocating a complex number to represent an amplitude and phase of each non-zero component of the non-contiguous spectrum and a zero value to represent the zero spectral components.

9. The apparatus in claim 8, wherein the electronic circuitry is configured to combine the non-contiguous spectrum spreading signal and a data symbol from the stream to produce a data modulated signal by:

multiplying the data symbol value with each of the complex numbers to generate a set of products, and performing a Discrete Fourier Transform on the set of products to produce the data modulated signal.

10. The apparatus in claim 9, wherein the electronic circuitry is configured to:

repeat a block of signal samples corresponding to the data modulated signal, and weight successive samples from the repeated blocks using a shaping function to produce a shaped data modulated signal.

11. The apparatus in claim 6, wherein the electronic circuitry is configured to:

select a sequence from a set of orthogonal sequences;

use the sequence to generate the non-contiguous spectrum and to determine a phase of successive non-zero spectral components;

produce a first data modulated signal using a first code from the set of orthogonal codes;

produce at least a second data modulated signal using a second code from the set of orthogonal codes;

combine the first and at least the second data modulated signals to produce a composite modulating signal; and use the composite modulating signal.

* * * * *

UNITED STATES PATENT AND TRADEMARK OFFICE
CERTIFICATE OF CORRECTION

| | | |
|---|---|---|
| PATENT NO. | : 7,864,663 B2 | Page 1 of 1 |
| APPLICATION NO. | : 11/929268 | |
| DATED | : January 4, 2011 | |
| INVENTOR(S) | : Dent | |

It is certified that error appears in the above-identified patent and that said Letters Patent is hereby corrected as shown below:

In Fig. 1, Sheet 1 of 7, for Tag "S3", in Line 1, delete "specturm" and insert -- spectrum --, therefor.

In Column 1, Line 64, delete "modem" and insert -- modern --, therefor.

In Column 5, Line 12, delete "receiver; and" and insert -- receiver. --, therefor.

In Column 7, Line 18, delete "symbol" and insert -- symbol, --, therefor.

In Column 7, Line 23, delete "oversapling" and insert -- oversampling --, therefor.

In Column 8, Lines 53-54, delete "(-1-1-1 00-1-10-1-1)" and insert -- (-1-1-1 00-1-10-1-1-1) --, therefor.

In Column 8, Line 57, delete "(IT)" and insert -- (IFT) --, therefor.

In Column 9, Line 30, delete "unction" and insert -- function --, therefor.

In Column 13, Line 19, delete "output" and insert -- output. --, therefor.

In Column 13, Line 59, delete "$D^2(i-N)+D^2(i)+D^2(i+N)=1,$" and insert -- $D2(i-N)+D2(i)+D2(i+N)=1,$ --, therefor.

In Column 15, Line 44, in Claim 6, delete "Apparatus" and insert -- An apparatus --, therefor.

Signed and Sealed this
Seventeenth Day of May, 2011

David J. Kappos
*Director of the United States Patent and Trademark Office*